UNITED STATES PATENT OFFICE.

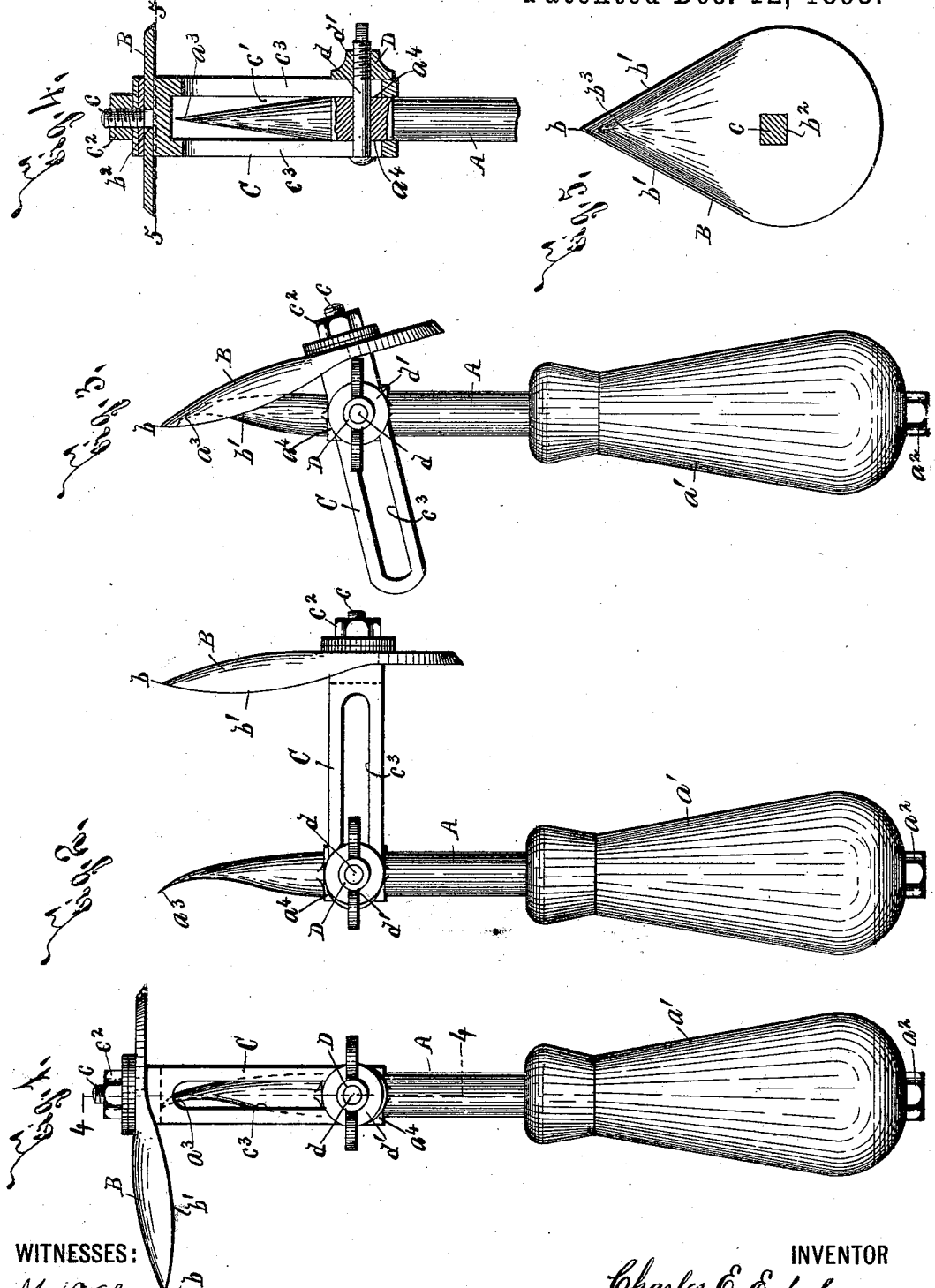

CHARLES E. ECKEL, OF SYRACUSE, NEW YORK.

PLUMBER'S TOOL.

SPECIFICATION forming part of Letters Patent No. 510,682, dated December 12, 1893.

Application filed August 14, 1893. Serial No. 483,075. (No model.)

*To all whom it may concern:*

Be it known that I, CHARLES E. ECKEL, of Syracuse, in the county of Onondaga, in the State of New York, have invented new and useful Improvements in Plumbers' Tools, of which the following, taken in connection with the accompanying drawings, is a full, clear, and exact description.

My invention relates to improvements in plumbers' tools, and has for its object the production of a device, which may be used as a surface or joint scraper, a compass, or a boring tool, and occupies but a minimum amount of space, is readily adjusted for the desired use, and forms a valuable acquisition to a plumber's kit of tools; and to this end it consists, essentially, in a body piece having a pointed extremity, a projecting arm or plate provided with a cutting edge, and a point, and a support having one end secured to the arm or plate and the other adjustably secured to the body piece.

The invention furthermore consists in the detail construction and arrangement of the parts, all as hereinafter more particularly described and pointed out in the claims.

In describing this invention, reference is had to the accompanying drawings, forming a part of this specification, in which like letters indicate corresponding parts in all the views.

Figure 1 is an elevation of my improved tool, illustrating the general arrangement of its parts when used as a surface or joint scraper. Fig. 2 is a similar elevation, the parts being adjusted for use as a compass. Fig. 3 is an elevation in which the parts of the tool are adjusted for a boring tool. Fig. 4 is a vertical sectional view, taken on line 4—4, Fig. 1, and Fig. 5 a horizontal sectional view, taken on line 5—5, Fig. 4.

It is well known that plumbers are now compelled to carry a tool for scraping surfaces, and particularly the joints of pipes to be soldered together; a compass for laying out apertures to be bored in pipes, walls, floors, &c., for the passage of pipes; and a boring tool for boring into pipes and other articles for making joints and similar purposes.

My invention consists of a single tool capable of any of these uses, which is easily carried, and is readily adjusted for the desired use.

A represents the body piece provided with a suitable hand engaging portion $a'$, and, if desired, with a clamping nut $a^2$ engaged with the outer end of said body piece for holding the hand piece in position. The opposite end of the hand piece A is formed with an outturned point $a^3$.

B represents the projecting arm or plate having one extremity formed with a rounded outer edge and the other with a point $b$, and converging downturned cutting edges $b'$ $b'$ extending toward the point $b$ from said rounding edge. The central portion of said arm or plate is formed with an opening $b^2$ of angular cross section, and interposed between the edges $b'$ $b'$ is a recess $b^3$ extending inwardly from the point $b$.

C is a support having one end provided with a spindle $c$, and the other with a bifurcation $c'$ for receiving the end of the body piece A provided with the point $a^3$. The base of the spindle $c$ is of angular cross section, and is passed through the opening $b^2$ of the arm or plate B, and the end of said spindle is screw threaded for receiving a clamping nut $c^2$ bearing against the outside of the arm or plate B, and preferably against washers interposed between said nut and the arm or plate, for securing said arm or plate to the adjacent end of the support C.

D is a clamp for securing the free end of the support C to the body piece A, and, as preferably constructed, this clamp consists of a pin or screw $d$ and a clamping nut $d'$ movable upon one end thereof. The pin $d$ is passed through the body piece A, and its opposite ends register with slots $c^3$ $c^3$ in the opposite branches of the adjacent end of the support C formed by the bifurcation in said support. Consequently the support C is hinged to the body piece A by the pin $d$, and, as said support is provided with lengthwise slots $c^3$ $c^3$, the support is movable lengthwise without requiring removal of the pin $d$, and the nut $d'$ secures the support C in its adjusted position. In order to permit of the easy movement of the support C the portion of the body piece A in proximity to the pin $d$ is provided with opposite flat surfaces $a^4$ $a^4$, which bear against the inner faces of the branches of the support C produced by the bifurcation $c'$.

When used as a surface or joint scraper the support C is arranged substantially parallel with the body piece A, and the clamp D is operated to firmly secure the same in said position. The diverging edges $b'$ $b'$ of the projecting arm or plate B are then free to scrape the surface to be operated upon. When used as a compass the support C is arranged substantially perpendicular to the body piece A, and the point $b$ is then in alignment with the point $a^3$ of said body piece, and may be readily moved around the point $a^3$ as a center for describing a circle.

In order to change my improved tool from a scraper, as shown at Fig. 1, to a compass as shown at Fig. 2, it is merely necessary to loosen the nut $d'$ of the clamp D and to swing the support upon the pin $d$ as a pivot until the point $b$ of the arm or plate B is in alignment with the point $a^3$.

In the construction of my invention illustrated, the distance from the point $b$ to the center of the corresponding end of the support C is equal to the distance from the point $a^3$ to the center of the pin $d$, but, if said distance from the point $b$ to the center of the corresponding end of the support C were greater or less than the distance from the point $a^3$ to the center of the pin $d$, the points $b$ $a^3$ might be readily aligned with each other, providing the support C were arranged at an angle with the body piece A.

When my improved tool is used as a boring machine the support C is moved lengthwise from its position indicated at Fig. 2, until the opposite end of the slots $c^3$ $c^3$ therein are registered with the pin $d$, and said support is then swung upon said pin as a pivot until the point $a^3$ is registered with the recess $b^3$ in the pointed end of the arm or plate B. The clamp D is then tightened to hold the support in its adjusted position, and, by turning the body piece A, the converging cutting edges $b'$ $b'$ operate to form a tapering opening in the article operated upon. If the point or the edges of the arm or plate B become worn or dull, said plate may be readily removed, and these parts are then readily sharpened, or a new plate may be substituted.

My invention is economically manufactured, consists of but a few parts, is capable of several uses, as described, occupies but a minimum space, is extremely handy and efficient in operation, and is evidently strong and durable in use.

The operation of my plumber's tool will be readily perceived from the foregoing description and upon reference to the drawings, and it is obvious that considerable change may be made in its detail construction and arrangement without departing from the spirit of my invention. Hence I do not herein specifically limit myself to such exact detail construction and arrangement.

Having thus fully described my invention, what I claim as new, and desire to secure by Letters Patent, is—

1. A plumber's tool comprising a body piece, a projecting arm or plate movable upon the body piece, and provided with a pointed extremity and with converging cutting edges, substantially as and for the purpose specified.

2. A plumber's tool comprising a body piece, having a pointed extremity a projecting arm or plate having a cutting edge, a support secured to the arm or plate and movable on the body piece at an angle therewith, and a clamp for securing said support to the body piece, substantially as and for the purpose specified.

3. A plumber's tool comprising a body piece, and a projecting arm or plate movable upon and removably secured to said body piece and formed with a pointed extremity and with cutting edges, converging at said pointed extremity substantially as and for the purpose described.

4. A plumber's tool comprising a body piece having a pointed extremity, a projecting arm or plate, and a support for said arm or plate hinged to said body piece, substantially as and for the purpose described.

5. A plumber's tool comprising a body piece, a projecting arm or plate having converging cutting edges, a support for the arm or plate movable on the body piece, and a clamp for securing said support to the body piece, substantially as set forth.

6. A plumber's tool comprising a body piece, a support secured at one end to said body piece, and an arm or plate having one extremity removably secured to said support and the other extremity provided with a point and cutting edges converging at said point, substantially as and for the purpose set forth.

7. A plumber's tool comprising a body piece having an outturned point at its extremity, and a projecting arm or plate movably mounted on said body piece and having a cutting edge and a recess in one face thereof at one side of said cutting edge for receiving said outturned point of the body piece, substantially as and for the purpose specified.

8. A plumber's tool comprising a body piece, a projecting arm or plate, a support having one end secured to said arm or plate and the other end formed with a bifurcation for receiving the body piece, and a clamp for securing said support to the body piece, substantially as and for the purpose set forth.

9. A plumber's tool comprising a body piece, a projecting arm or plate having a cutting edge, a support having one end secured to said arm or plate and the other end formed with a bifurcation for receiving the body piece, and a clamp for securing said support to the body piece, substantially as and for the purpose described.

10. A plumber's tool comprising a body piece, a projecting arm or plate having a point and converging side edges leading to said point, a support having one end secured to said arm or plate and the other end formed with a bifurcation for receiving the body piece, and a clamp for securing said support to the body piece, substantially as and for the purpose specified.

11. A plumber's tool comprising a body piece, a projecting arm or plate, a support having one end secured to said arm or plate, and its other end provided with a slot and a clamp passed through said slot and secured to the body piece, substantially as and for the purpose described.

12. A plumber's tool comprising a body piece, a projecting arm or plate having a rounded edge at one extremity, and converging downturned inner edges at its opposite extremity, a support having one end secured to said arm or plate and its other end movable upon the body piece, substantially as and for the purpose specified.

In testimony whereof I have hereunto signed my name, in the presence of two attesting witnesses, at Syracuse, in the county of Onondaga, in the State of New York, this 11th day of August, 1893.

CHARLES E. ECKEL.

Witnesses:
CLARK H. NORTON,
E. H. WEISBURG.